United States Patent [19]

Ching et al.

[11] Patent Number: 4,516,258

[45] Date of Patent: May 7, 1985

[54] BIT ALLOCATION GENERATOR FOR ADAPTIVE TRANSFORM CODER

[75] Inventors: Yau-Chau Ching, Morganville; James D. Tomcik, Aberdeen, both of N.J.

[73] Assignee: AT&T Bell Laboratories, Murray Hill, N.J.

[21] Appl. No.: 393,690

[22] Filed: Jun. 30, 1982

[51] Int. Cl.³ .............................................. G10L 1/00
[52] U.S. Cl. ...................................................... 381/31
[58] Field of Search .................................... 381/29–35, 381/47; 375/25, 26, 34, 122

[56] References Cited

U.S. PATENT DOCUMENTS 4,184,049 1/1980 Crochiere et al. ...................... 179/1
4,216,354 8/1980 Esteban et al. ......................... 381/31

OTHER PUBLICATIONS

"Frequency Domain Coding of Speech" by Jose M. Tribolet and Ronald E. Crochiere, IEEE Transactions on Acoustics, Speech, and Signal Processing, vol. AS-SP-27, No. 5, pp. 512–530, Oct. 1979.

Primary Examiner—E. S. Matt Kemeny
Attorney, Agent, or Firm—Thomas Stafford

[57] ABSTRACT

Adaptive bit allocation to a set of spectral transform coefficients is optimized by setting a predetermined first (maximum) threshold, then allocating one bit to those coefficients above the threshold, no bits to those below. If the total number of bits has not been allocated, the threshold is lowered an "integer" step to a second threshold, and again one bit allocated to those coefficients above the second threshold. The procedure is iterated until all the total bits are allocated or, if too many bits are allocated after the last integer step, a "fractional" step threshold is used.

5 Claims, 5 Drawing Figures

BIT ALLOCATION GENERATOR FOR ADAPTIVE TRANSFORM CODER

TECHNICAL FIELD

This invention relates to adaptive transform coding of speech signals and, more particularly, to a bit allocation generator for use in an adaptive transform coder.

BACKGROUND OF THE INVENTION

Adaptive transform coding is a speech compression technique in which a speech signal is sampled and the samples are partitioned into blocks. Each block is transformed into a set of transform coefficient signals representative of amplitudes of frequency components of speech components in the block. The coefficient signals are quantized to form coded signals which are transmitted over a channel. At a receiver, the coded signals are decoded and inverse transformed to generate the block of speech samples.

In adaptive transform coding it is desirable to encode the transform coefficients efficiently by allocating each coefficient only enough bits to minimize a mean square distortion measure and, consequently, have a flat quantizing noise distribution in the frequency domain. Analysis has shown that the average distortion is minimized by equalizing the per coefficient distortion. Since the coefficient distortion is directly related to coefficient variance, a larger number of bits are typically allocated to coefficients of high variance and a smaller number of bits, if any, are allocated to coefficients of small variance.

Several attempts have been made towards efficiently allocating bits to the coefficients. One prior adaptive transform coding arrangement, including a bit allocation technique, is disclosed in U.S. Pat. No. 4,184,049 issued to R. E. Crochiere and J. M. N. S. Tribolet, on Jan. 15, 1980. Also, see an article entitled, "Frequency Domain Coding of Speech" by J. M. Tribolet and R. E. Crochiere, *IEEE Transactions on Acoustics, Speech, and Signal Processing*, Vol. ASSP-27, No. 5, Oct. 5, 1979. In this prior bit allocation technique, bits are initially allocated to the coefficients based on a theoretical solution. Thereafter, initial bit allocations, which are less than a minimum value, are set to "zero", and new bit allocations are computed for the coefficients. The new bit allocations which are greater than a maximum value are rounded down to a predetermined value. New bit allocations are again computed and, then, modified by adding or subtracting bits because of rounding off of the individual bit allocations. This process is iterated until the number of bits allocated to the coefficients equals a total number of bits available for the block.

One problem with this prior bit allocation technique is that negative bit allocations are possible. Consequently, the other coefficients have been allocated too many bits. This requires time-consuming iterations, as does the rounding technique. Moreover, realtime bit allocations using the prior arrangement would require a so-called array processor, for example, a programmable high-speed computer, which is undesirable because of its cost, size and complexity.

SUMMARY OF THE INVENTION

In accordance with an aspect of the invention, bit allocation in an adaptive transform coder is efficiently achieved by employing a bit counting technique in which a so-called bit allocation grid is controllably positioned relative to the coefficients to be allocated bits. The grid is initially positioned at a first amplitude threshold having a predetermined magnitude and a number of bits allocated each coefficient is initially set to a predetermined value, for example, "zero." Coefficient magnitudes are compared to the first threshold and bit allocations of coefficients having magnitudes in prescribed relationship to the first threshold magnitude, for example, equal to or greater than the first threshold magnitude, are adjusted in accordance with a prescribed criterion, for example, incremented by one bit. After all of the coefficient magnitudes have been compared with the first threshold magnitude, the number of bits allocated is examined to determine if it is equal to or greater than the total number of bits available. If not, the number of bits allocated is less than the total number of bits available and the bit allocation grid is repositioned by adjusting the first threshold magnitude in accordance with a prescribed criterion, for example, decrementing the first threshold magnitude by a predetermined value. All of the coefficient magnitudes are again compared to the first threshold and the number of bits allocated to coefficients having magnitudes in the prescribed relationship to the first threshold are again adjusted in accordance with the prescribed criterion, i.e., one bit is allocated to each coefficient having a magnitude equal to or greater than the adjusted first threshold magnitude. The number of bits allocated is again examined to determine if it is equal to or greater than the total number of bits available. The threshold adjustment and bit allocation process is iterated until the total number of bits allocated is equal to the total number of bits available and the bit allocation grid is exactly positioned.

In one embodiment of the invention, the coefficient magnitudes are each represented by an integer portion and a fractional portion. The bit allocations to the coefficients are determined by first comparing the integer portions of the coefficient magnitudes to the first threshold and incrementing the number of bits allocated to coefficients having integer magnitude portions in the prescribed relationship to the first threshold, i.e., equal to or greater than the first threshold. After all of the integer portions of the coefficient magnitudes have been compared with the first threshold, the number of bits allocated is examined to determine if it is equal to or greater than the total number of bits available. If not, the number of bits allocated is less than the total number of bits available and the first threshold magnitude is adjusted in accordance with the prescribed criterion, i.e., decremented by a prescribed integer magnitude value, and the integer portions of the coefficient magnitudes are again compared to the first threshold. The number of bits allocated to coefficients having their integer portion in the prescribed relationship to the first threshold, i.e., equal to or greater than the first threshold, is again adjusted in accordance with the prescribed criterion, i.e., by incrementing by one bit the number allocated to each coefficient having a magnitude equal to or greater than the first threshold. The number of bits allocated to the plurality of signal amplitude coefficients is again examined to determine if it is equal to or greater than the total number of bits available. The threshold adjustment and bit allocation process is iterated until the total number of bits allocated is equal to or greater than the total number of bits available. If the total number of bits allocated is equal to the total number of bits available, an optimum bit allocation has been reached and the process is terminated. However, if the number of bits allocated is greater than the total number of bits available, a second threshold is set to have a magnitude equal to a predetermined minimum value, for example, "0". Then, the fractional portion of the coefficient magnitude of each of the plurality of signal amplitude coefficients is compared to the second threshold in a prescribed sequence. The number of bits allocated to coefficients having a fractional magnitude portion in a prescribed relationship, for example, equal to the second threshold is adjusted in accordance with a prescribed criterion, for example, decrementing by "one" bit in the sequence. After each decrementing of an individual bit assignment, the number of bits allocated is examined to determine if it is equal to the total number of bits available. When the number of bits allocated equals the total number of bits available, the optimum bit allocation has been reached and the process is terminated. If at the end of the sequence, the number of bits allocated still exceeds the total number available for allocation, the magnitude of the second threshold is adjusted in accordance with a criterion, for example, increased by a predetermined value. The fractional magnitude portions of each of the plurality of signal amplitude coefficients are again compared in sequence to the adjusted second threshold and one bit is decremented in the sequence from the bits allocated to each amplitude coefficient having a fractional magnitude equal to the adjusted second threshold. If the number of bits allocated at the end of the sequence still exceeds the total number of bits available, the comparison and bit allocation adjustment procedures are again repeated. The second threshold adjustment, fractional number portion comparison and bit allocation procedures are iterated until the number of bits allocated is equal to the total number of bits available.

BRIEF DESCRIPTION OF THE DRAWING

The invention will be more fully understood from the following detailed description of illustrative embodiments thereof taken in connection with the appended figures, in which.

DETAILED DESCRIPTION

Figure 1:
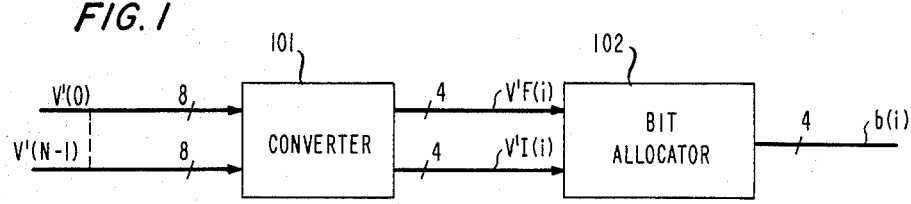
FIG. 1 shows in simplified block diagram form an arrangement for allocating bits to amplitude coefficients for use in an adaptive transform coding arrangement.

FIG. 1 shows in simplified block diagram form a bit allocation generator in accordance with an aspect of the invention. As is known, in adaptive transform coding a predetermined total number of bits (BT) is to be allocated to amplitude coefficients $V'(i)$ in a block of samples of a shaped power spectrum $V'$, where $V'(i) = 0.5 \log_2 \delta^2 i$ and $i = 0, 1, \ldots N-1$ (see FIG. 2). In this example, $N = 128$ and $1, \ldots N-1$ (see FIG. 2). In this example, $N = 128$ and $BT = 512$. Signals representative of amplitude coefficient $V'(i)$ of the shaped power spectrum shown in FIG. 2, namely, $V'(0)$ through $V'(N-1)$ are obtained in well-known fashion. See, for example, U.S. Pat. No. 4,184,049, cited above, specifically, FIG. 11 and the corresponding description.

Coefficient signals $V'(0)$ through $V'(N-1)$ are supplied to converter 101 (FIG. 1). Signals $V'(0)$ through $V'(N-1)$ typically consist of 8 bits each, 4 bits representative of an integer portion of the coefficient magnitude, namely, $V'I(i)$ and 4 bits representative of a fractional portion of the coefficient magnitude, namely, $V'F(i)$. Thus, converter 101 generates $V'I(i)$ and $V'F(i)$ for coefficients, $i = 0, 1, \ldots N-1$ in well-known fashion and supplies the 4 bit integer portion and fractional portion representations to bit allocator 102. To this end, converter 101 includes two parallel in-serial out shift registers (not shown). In one example, the shift registers are $4 \times 128$ type. The number adjacent the slanted lines in the circuit connections indicates the number of parallel circuit paths therein. Thus, for example, $V'(0)$ includes 8 bits on 8 parallel circuit paths and $V'F(i)$ includes 4-bits on 4 parallel circuit paths.

Figure 2:
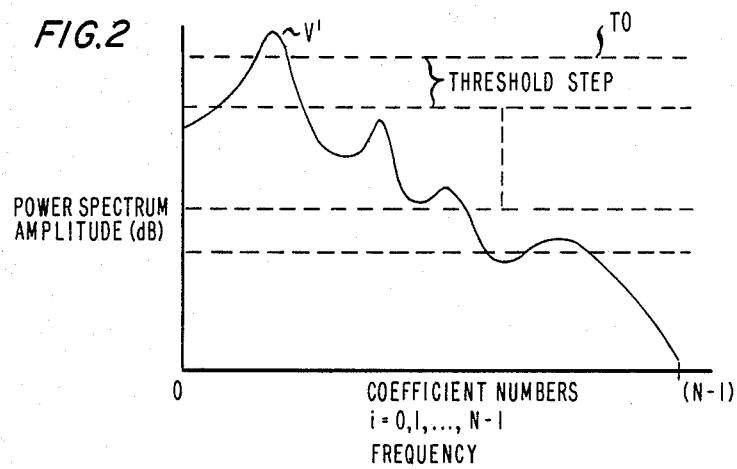
FIG. 2 shows in graphical form a log variance plot for the amplitude coefficients, namely, a power spectrum vs. frequency.

Bit allocator 102 generates bit allocations $b(i)$ for coefficients $V'(i)$, each of which, consists of 4 bits. The bit allocation process may be explained by referring to FIG. 2. FIG. 2 illustrates in graphical form the positioning of a bit allocation grid on the shaped power spectrum of the speech samples having amplitude coefficients $V'(i)$ for frequency components $i = 0, 1, \ldots N-1$, i.e., the log variance plot of the coefficients. Bit allocations to coefficients $V'(i)$ is equivalent to locating the origin of the grid on the log variance plot. Since $V'(i) = 0.5 \log_2 \delta^2 i$ is the coefficient variance, the grid amplitude steps are one unit each which is equivalent to 6 dB if the log variance plot amplitude were in dB. Each of coefficients $V'(i)$ is represented by R-bits for an integer portion of its magnitude, namely, $V'I(i)$ and S-bits for a fractional portion of its magnitude, namely, $V'F(i)$. In accordance with one aspect of the invention, the bit allocation grid is approximately positioned by first considering integer portions $V'I(i)$. To this end, all bit allocations $b(i)$ to coefficients $V'(i)$ are initially adjusted to a predetermined value, in this example, zero. A first threshold T0 is initially set to a predetermined maximum value, in this example, $2^R - 1$ corresponding to $6(2^R - 1)$db, and integer portions $V'I(i)$ are compared to T0. The number of bits allocated to coefficients having integer portions in prescribed relationship to T0 are adjusted in accordance with a prescribed criterion. In this example, $V'I(i)$ is compared with T0 and the corresponding bit allocation is incremented by one if $V'I(i) \geq T0$. At the end of a $V'I(i)$ comparison pass, the number of bits allocated (B) is compared to the total number of bits available (BT) to determine if $B \geq BT$. If not, the value of threshold T0 is adjusted in accordance with a prescribed criterion. In this example, integer threshold T0 is decremented by one unit, thereby dropping the grid down one step on the log variance plot. The comparison process is repeated and additional bits are allocated until $B \geq BT$. If $B = BT$, the allocation grid is exactly positioned and an optimum bit allocation has been obtained. However, if $B > BT$, too many bits have been allocated. Note, that in this example, at most, 127 more bits can be allocated than are available.

Refinement of the bit allocations is achieved in accordance with an aspect of the invention by now considering fractional portions $V'F(i)$ of the coefficient magnitudes. A second threshold, namely fractional threshold T1, is set to a predetermined value. In this example, T1 is set to the smallest possible fractional portion, zero. Fractional portions V'F(i) are compared in sequence to T1, specifically, from i=0 through i=N−1. If the individual magnitude of V'F(i) in the sequence is in a prescribed relationship with T1, in this example, if V'F(i)=T1, the corresponding bit allocation b(i) is adjusted in accordance with a prescribed criterion. In this example, b(i) is decremented by one, if b(i) is not zero. Thus, b(i) cannot be negative. The number of bits allocated (B) is also decremented by one, and when B=BT the process ends. If B is still greater than BT at the end of the sequence, then the magnitude of second threshold T1 is adjusted in accordance with a prescribed criterion. In this example, T1 is incremented to the next smallest allowable fractional portion and the processes of comparing V'F(i) to T1 and decrementing bits are iterated. Since bits allocated B is compared to the total number available bits, BT, after each bit has been decremented, the bit allocation is optimum when the process is terminated. As will be apparent, bits are first decremented from coefficients having the smallest fractional portion so that a larger number of bits are allocated to coefficients having the largest variance.

In summary, bit allocations to the coefficients are rapidly realized by first approximately positioning the bit allocation grid through adjusting it in threshold units in relationship to integer portions of the coefficient magnitudes until the number of bits allocated is equal to or greater than the total number available. If the number of bits allocated is greater than the total number available after an integer comparison pass, too many bits have been allocated and the grid has been positioned too low. Then, the grid is more accurately positioned through adjusting the number of bits allocated by comparing fractional portions of the coefficient magnitudes to a minimum threshold and decrementing the corresponding bit allocations which equal the minimum threshold until the total number of bits allocated is equal to the total number of bits available. This corresponds to raising the grid origin by a fractional amount.

Figure 3:
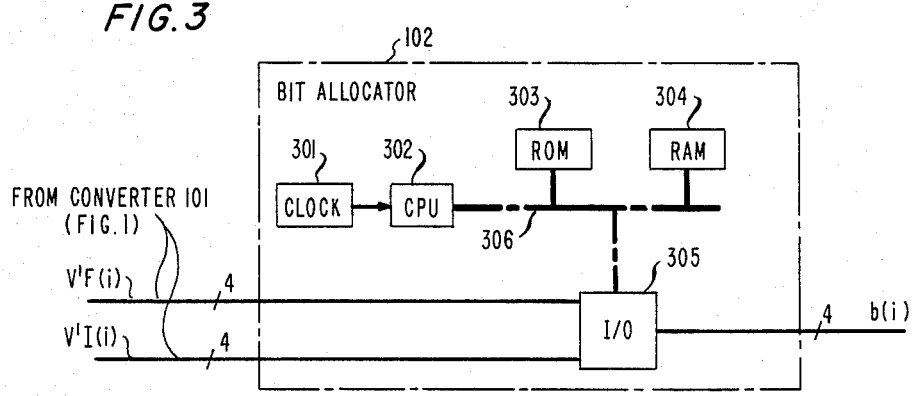
FIG. 3 depicts in simplified block diagram form one embodiment of a bit allocator which may be employed in the arrangement of FIG. 1.

FIG. 3 shows in simplified block diagram form one embodiment of bit allocator 102 on which the invention may be practiced. Accordingly, shown are clock 301, processing unit (CPU) 302, read only memory unit (ROM 303), read-write memory unit, commonly referred to as random access memory (RAM) 304 and input/output (I/O) 305 all interconnected via bus 306 to form, for example, a computer system or a high speed digital processing unit now known in the art.

Accordingly, digital signals representative of the integer magnitude portions V'I(i) and the fractional magnitude portions V'F(i) are supplied to bit allocator 102 via I/O 305 to be processed for generating the corresponding coefficient bit allocations b(i).

Figure 4:
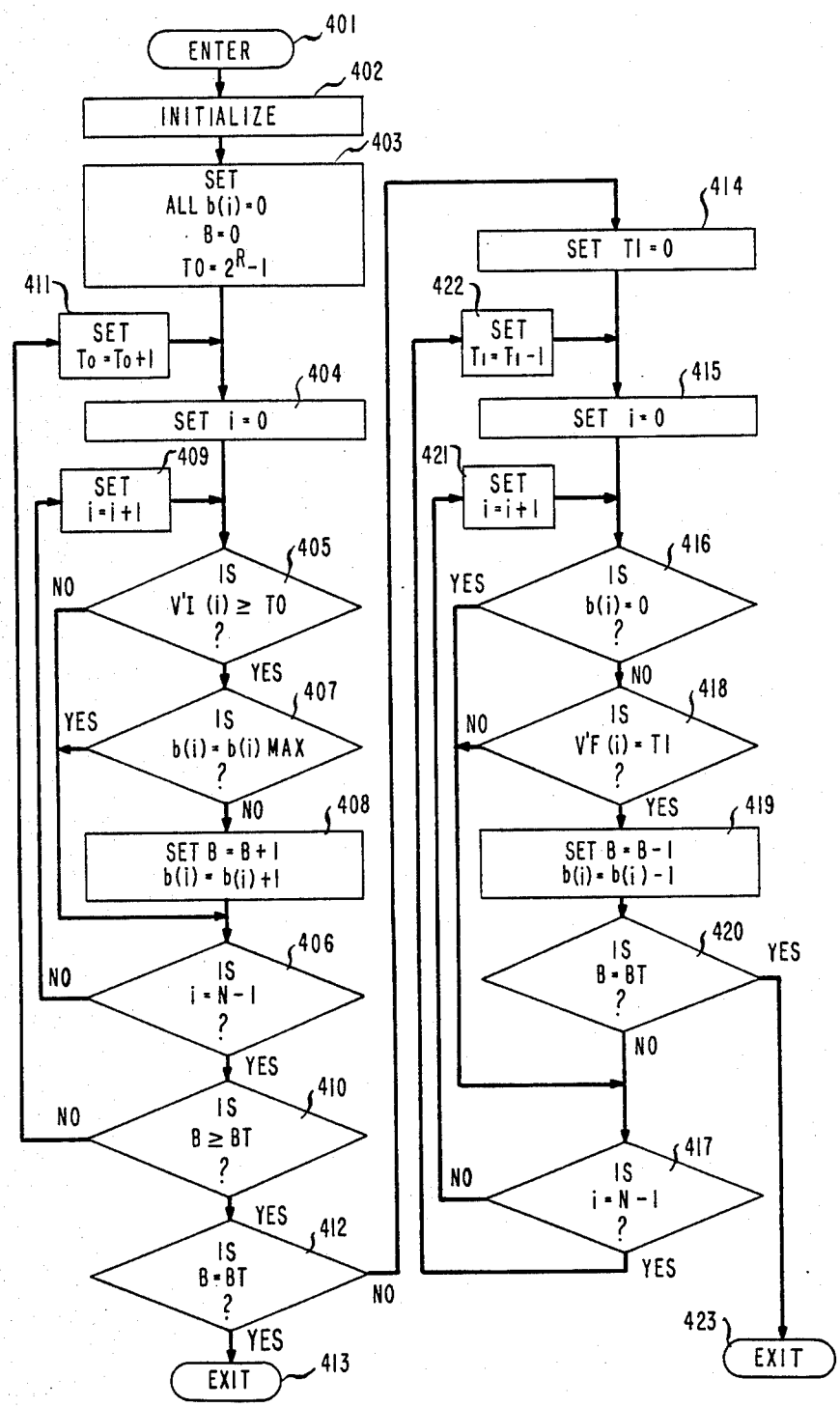
FIG. 4 illustrates a flowchart of a program routine illustrating a sequence of steps employed in the bit allocator of FIG. 3 for effecting an optimum bit allocation to the amplitude coefficients.

FIG. 4 depicts a flowchart of a program routine for realizing the bit allocation in accordance with an aspect of the invention by utilizing the bit allocator shown in FIG. 3. Code instructions for the routine are stored in ROM 304 of FIG. 3.

Accordingly, the program routine is entered via oval 401. Operational block 402 initializes the system by, for example, adjusting V'I(i) to be within a maximum value, for example, V'I(i)=$2^R$−1. Similarly, operational block 403 sets coefficient bit allocations b(i) to zero, the number of bits allocated B to zero and first threshold T0 to a predetermined maximum value. In this example, T0=$2^R$−1, where R=4. Operational block 404 initializes the loop counter i to zero, namely, i=0.

Conditional branch point 405 determines if V'I(i)≧T0. If not, i.e., test result is NO, control is transferred to conditional branch point 406. If so, i.e., test result is YES, control is transferred to conditional branch point 407, which tests to determine if b(i)=b(i)-MAX. In this example, b(i)MAX=4. If so, control is transferred to conditional branch point 406. If not, operational block 408 increments the count of bits allocated, namely, B=B+1, and increments the number of bits allocated to the corresponding coefficient, namely, b(i)=b(i)+1. Thereafter, control is transferred to conditional branch point 406. Conditional branch point 406 determines whether i=N−1. If so, all of the integer portions of the coefficients have been compared to threshold T0 and control is transferred to conditional branch point 410. If not, operational block 409 increments to the next coefficient, namely, sets i=i+1 and control is returned to conditional branch point 405. The operation of steps 405, 406, 407, 408 and 409 are iterated until i=N−1.

Conditional branch point 410 determines if B≧BT. If not, operational block 411 adjusts integer threshold T0 by one unit, namely, set T0=T0−1. Thereafter, control is returned to operational block 404. The operation of steps 404 through 411 are iterated until conditional branch point 410 yields a yes result, i.e., B≧BT.

Conditional branch point 412 determines whether B=BT. If so, the bit allocation grid is exactly positioned and optimum bit allocation has been obtained. Consequently, the routine is exited via oval 413. If not, operational block 414 sets fractional threshold T1 to zero. Operational block 415 sets i=0.

Operational branch point 416 determines whether the number of bits allocated to the corresponding coefficient is zero, i.e., b(i)=0. If so, control is transferred to conditional branch point 417. If not, control is transferred to conditional branch point 418 which determines whether V'F(i)=T1. If not, control is transferred to conditional branch point 417. If so, operational block 419 decrements the number of bits allocated to the corresponding coefficient by setting b(i)=b(i)−1 and decrements the number of bits allocated B by setting B=B−1.

Conditional branch point 420 tests to determine if B=BT. If so, an optimum bit allocation has been obtained and the routine is exited via oval 423. If not, conditional branch point 417 determines whether i=N−1. If not, operational block 421 increments the coefficient number, namely, setting i=i+1 and control is returned to conditional branch point 416. Steps 416 through 421 are repeated until conditional branch point 420 determines that B=BT or conditional branch point 417 determines that i=N−1 if B still does not equal BT.

When conditional branch point 417 determines i=N−1 and B still does not equal BT, operational block 422 adjusts fractional threshold T1 by incrementing it one unit, namely, setting T1=T1+1 and control is returned to operational block 415. Steps 415 through 422 are repeated until conditional branch point 420 indicates that B=BT. When this occurs, the adaptive bit allocation is optimum and the routine is exited via oval 423.

Figure 5:
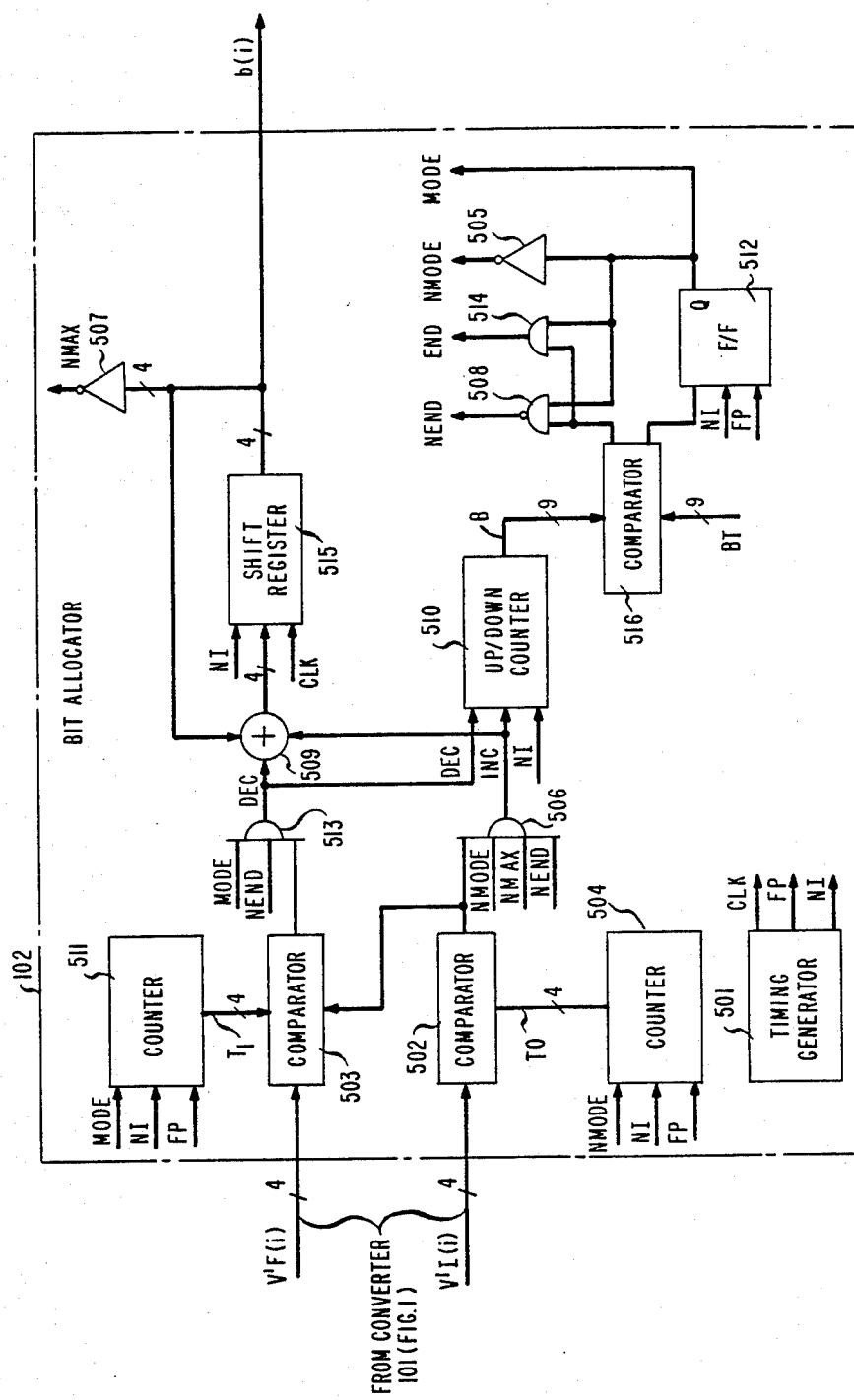
FIG. 5 shows another embodiment of a bit allocator which may be employed in the arrangement of FIG. 1.

FIG. 5 shows in simplified block diagram form another embodiment of bit allocator 102 which may be employed in the adaptive bit allocation arrangement of FIG. 1. Accordingly shown, is timing generator 501 which is employed to generate timing signals CLK, FP and NI in well-known fashion. In this example, CLK is a pulse string at 2.048 MHz, FP occurs every 2.048/N MHz or at a 16 KHz rate and NI is an initialization signal which occurs once every adaptive transform coding (ATC) frame, which is typically every 16 milliseconds.

Integer signals V'I(i) are supplied from converter 101 in sequence to one input of comparator 502. A 4 bit signal representative of the magnitude of integer threshold T0 is supplied to a second input of comparator 502 from counter 504. Counter 504 is a so-called down counter which is initially set to the predetermined maximum value for T0. In this example, T0 equals 1111 bits or digital 15. Counter 504 is enabled via a logical 1 NMODE signal from inverter 505, initialized to the count of 15 via NI from timing generator 501 and clocked via FP to adjust the threshold value of T0 every 128 clock pulses. That is to say, the value of T0 is decremented by one at the end of an integer portion coefficient comparison pass. The decrementing of counter 504 continues until $B \geq BT$ and counter 504 is disabled via NMODE being a logical 0. An output from comparator 502 is supplied to one input of NAND GATE 506 and to a first input of comparator 503. A logical 1 output is generated by comparator 502 when V'I(i)$\geq$T0. Otherwise, a logical 0 output is generated. NAND GATE 506 is jointly responsive to logical signals NMODE, NMAX from inverter 507 and NEND from NAND GATE 508 to generate a logical 1 INC signal when comparator 502 generates a logical 1 output indicative that V'I(i)$\geq$T0, and that both bit allocation b(i) for the corresponding coefficient and the number of bits allocated B is to be incremented by one. To this end, INC is supplied to an add input of adder 509 and to an up count input of up/down counter 510.

Similarly, fractional signals V'F(i) are supplied from converter 101 in sequence to a second input of comparator 503. A 4 bit signal representative of fractional threshold T1 is supplied from counter 511 to a third input of comparator 503. Counter 511 is a so-called up counter which is initially set to a predetermined minimum threshold representative of the smallest allowable fractional portion. In this example, T1=0000 bits or digital zero. Counter 511 is enabled via a logical 1 MODE signal from flip flop 512, initialized to zero count via NI and clocked via FP to adjust the value of threshold T1 every 128 clock pulses. That is to say, the value of T1 is incremented by one at the end of a fractional portion comparison pass provided that B does not equal BT. MODE is a logical 1 when B>BT, otherwise MODE is a logical 0. Thus, counter 511 is enabled only when B>BT. Similarly, comparator 503 is enabled when a logical 1 output is generated from comparator 502. The logical 1 output from comparator 502 indicates that the number of bits allocated b(i) to the corresponding coefficient is not zero, because comparator 502 only generates a logical 1 when V'I(i) is equal to or greater than T0. This inhibits the comparison of V'F(i) to T1 when the number of bits allocated b(i) is zero for the coefficient represented by V'F(i). This eliminates the possibility of a negative bit allocation. Otherwise, the output from comparator 502 is a logical 0. Comparator 503 generates a logical 1 output only when V'F(i) equals T1 and b(i) is not zero. Otherwise, a logical 0 output is generated. As indicated above, this insures that bits are decremented only from coefficients to which bits have been allocated and first from coefficients having the smallest fractional portion, i.e., coefficients having magnitudes closest to the corresponding integer threshold magnitude T0. An output from comparator 503 is supplied to one input of AND gate 513. AND gate 513 is jointly responsive to a logical 1 MODE signal from flip flop 512 and a logical 1 NEND signal from NAND gate 508 to generate a logical 1 DEC signal when comparator 503 generates a logical 1 output indicative that V'F(i)=T1 and that both bits allocated B and bits allocated to the corresponding coefficient b(i) are to be decremented. To this end DEC is supplied from AND gate 513 to a subtract input of adder 509 and a down count input of up/down counter 510.

Adder 509 and shift register 515 are employed to increment or decrement bits allocated to the coefficients b(i). An output from shift register 515 is the desired coefficient bit allocation b(i) and is available during the ATC frame for use as desired. Shift register 515 continues to operate after each cycle of comparing the integer magnitudes V'I(i) to the integer threshold T0 and the fractional magnitude V'F(i) to fractional threshold T1. Since both INC and DEC are logical 0 at the end of each comparison cycle, coefficient bit allocations b(i) continue to circulate in shift register 515 and, hence, are essentially stored for later use. Adder 509 is used to algebraically combine DEC or INC with the output of shift register 515.

Up/down counter 510 keeps a count of the total number of bits allocated, B. Counter 510 is initialized each ATC frame by NI and is responsive to INC to count up and DEC to count down. Since the integer portions V'I(i) are compared first, there is always an up count before any down counting occurs. As indicated above, no down counting occurs until after B>BT. Since BT in this example is 512, and since only 128 more bits may be allocated than available, there can never be a negative bit count.

Output B of counter 510 is supplied to one input of comparator 516, while a digital signal representative of the total number of bits available BT is supplied to a second input. As indicated above, in this example, BT=512. Thus, a 9 bit signal representative of digital 512 is supplied to a second input of comparator 516. A first output of comparator 516 is supplied to first inputs of AND gate 508 and NAND gate 514. This first output from comparator 516 is a logical 0 for B=BT and a logical 1 otherwise. A second output from comparator 516 is supplied to an input of flip flop 512. This second output from comparator 516 is a logical 0 for B$\geq$BT, and a logical 1 otherwise. Flip flop 512 is, for example, a J-K type which generates a logical 1 Q output in response to a logical 1 from comparator 516 upon occurrence of the next FP pulse from timing generator 501. This insures that any change in signals NEND, END, NMODE and MODE occurs at the end of an integer portion magnitude comparison pass or when B=BT. Flip flop 512 is initialized via NI. Output Q from flip flop 512 is signal MODE and is also supplied to inverter 505 to generate NMODE, AND gate 508 to generator NEND and AND gate 514 to generator END. A logical 1 END signal indicates the end of the allocation process.

In summary, MODE is a logical 1 for B>BT and a logical 0 otherwise, N MODE is the inverse of MODE, END is a logical 1 for B=BT and a logical 0 otherwise and NEND is the inverse of END.

Since bit allocator 102 of FIG. 5 requires a maximum of $2^R N + 2^S N$ shifts and comparisons, i.e., the maximum number of integer portion comparisons, and fractional portion comparisons, the optimum coefficient bit allocations b(i) are rapidly obtained. In this example, R=4, S=4 and N=128. Consequently, a maximum of 4096 shifts and comparisons is needed. Since, in this example, CLK=2.048 MHz the optimum coefficient bit allocations b(i) are obtained in a maximum of 2 milliseconds. The 2 millisecond interval is only a small portion of an ATC frame period, which typically is 16 milliseconds.

The above arrangements are only examples of embodiments of the invention. It will be apparent to those skilled in the art that various changes in form and detail may be made without departing from the spirit and scope of the invention. Indeed, the hardware embodiment is readily multiplexable for use on several ATC arrangements. Additionally, although the invention has been described in an adaptive transform coding environment, it is equally applicable to other coding arrangements, for example, a subband encoder.

What is claimed is:

1. Apparatus for allocating a predetermined total number of bits to a plurality of signal amplitude coefficients in an adaptive transform coding frame, each amplitude coefficient including an integer magnitude portion representation and a fractional magnitude portion representation, the apparatus comprising, means for controllably generating an integer threshold representative of a predetermined magnitude, said integer threshold magnitude being initially adjusted during each coding frame to a predetermined maximum integer value, means for comparing the integer magnitude representation of each of said plurality of signal amplitude coefficients to the integer threshold magnitude value, means for allocating one bit to each of the signal amplitude coefficients having an integer magnitude which is equal to or greater than the integer threshold magnitude value, means for controllably counting the number of bits allocated to said plurality of signal amplitude coefficients, means responsive to the allocated bit count for controllably decreasing the integer threshold magnitude by a prescribed integer magnitude value if the allocated bit count is less than the predetermined total number of bits to be allocated after comparing all of said plurality of signal amplitude coefficient magnitudes to the integer threshold magnitude value, wherein each of said plurality of amplitude coefficient integer magnitudes is compared to said integer threshold magnitude value after each decrease in the integer threshold magnitude and one bit is added to the bits allocated to each of said plurality of amplitude coefficients having an integer magnitude which is equal to or greater than said integer threshold magnitude during each comparison cycle, means for controllably generating a fractional threshold representative of a predetermined fractional magnitude, said fractional threshold magnitude being initially adjusted during each coding frame to a predetermined minimum fractional value, means for comparing the fractional magnitude representations of said plurality of signal amplitude coefficients in a prescribed sequence to the fractional threshold magnitude value, means responsive to the allocated bit count for decreasing by one bit the number of bits allocated a signal amplitude coefficient in the sequence having a fractional magnitude equal to the fractional threshold magnitude value when the allocated bit count is greater than the predetermined total number of bits to be allocated during the coding frame, and means responsive to the allocated bit count for controllably increasing the fractional threshold magnitude by a prescribed fractional magnitude value if the allocated bit count is greater than the predetermined total number of bits to be allocated during the coding frame upon completion of the fractional threshold comparison sequence, wherein one bit is decremented from the bits allocated to each of said plurality of signal amplitude coefficients in said sequence having a fractional magnitude equal to said fractional threshold.

2. Apparatus as defined in claim 1 wherein said integer threshold generating means includes a controllable counter, and said bit allocating means includes storage means having a plurality of stages associated on a one-to-one basis to said plurality of signal amplitude coefficients and means responsive to outputs from the integer magnitude comparing means for inputting the allocated number of bits in stages of the storage means associated with ones of said plurality of signal amplitude coefficient having an integer magnitude which is equal to or greater than said integer threshold magnitude value.

3. Apparatus as defined in claim 2 wherein said fractional threshold generating means includes a controllable counter, and said means for decreasing the number by one of bits allocated a signal amplitude coefficient includes means responsive to outputs from said fractional magnitude comparing means for controllably decrementing by one the number of bits stored in the storage means stages of the signal amplitude coefficients having a fractional magnitude which is equal to the fractional threshold magnitude value.

4. Apparatus as defined in claim 3 wherein said storage means include a shift register having a plurality of stages equal to the number of said plurality of signal amplitude coefficients, said bit allocation counting means includes an up/down counter, and wherein said storage means inputting means and decreasing means includes algebraic combining means supplied with an output from the shift register and being responsive to outputs from said integer magnitude comparing means and said fractional magnitude comparing means for adding one bit to the shift register output when the shift register output is to be incremented in response to an output from said integer magnitude comparing means or for subtracting one bit from the shift register output when the shift register output is to be decremented in response to an output from said fractional magnitude comparing means.

5. In a coder, a method for allocating a predetermined total number of bits to be allocated in an adaptive transform coding frame to a plurality of signal amplitude coefficients, each coefficient including an integer magnitude portion representation and a fractional magnitude portion representation, comprising the steps of, (a) controllably generating an integer threshold representative of a predetermined magnitude, said integer threshold magnitude being initially adjusted during each coding frame to a predetermined maximum value, (b) comparing the integer magnitude representation of each of said plurality of signal amplitude coefficients to the integer threshold magnitude value, (c) allocating one bit to each of the signal amplitude coefficients having an integer magnitude which is equal to or greater than the integer threshold magnitude value, (d) counting the number of bits allocated to said plurality of signal amplitude coefficients, (e) decreasing the integer threshold magnitude by a prescribed integer magnitude value if the allocated bit count is less than the predetermined total number of bits to be allocated after comparing all of said plurality of signal amplitude coefficient magnitudes to the integer threshold magnitude value, (f) repeating steps (b) through (e) until the allocated bit count is equal to or greater than the predetermined total number of bits to be allocated to said plurality of signal amplitude coefficients during said coding frame, (g) if the allocated bit count is greater than the predetermined total number of bits, generating a fractional threshold representative of a predetermined fractional magnitude, said fractional threshold magnitude being initially adjusted during each coding frame to a predetermined minimum fractional value, (h) comparing the fractional magnitude representations of said plurality of signal amplitude coefficients in a prescribed sequence to the fractional threshold magnitude value, (i) decreasing by one bit the number of bits allocated a signal amplitude coefficient in the sequence having a functional magnitude equal to the fractional threshold magnitude value if the allocated bit count is greater than the predetermined total number of bits to be allocated during the frame, (j) increasing the fractional threshold by a predetermined fractional magnitude value if the allocated bit count is greater than the predetermined total number to be allocated during the frame of bits upon completion of the fractional threshold comparison sequence, and (k) repeating steps (h) through (j) until the allocated bit count equals the predetermined total number of bits to be allocated during the frame.

* * * * *